United States Patent [19]

Hinchliffe

[11] 4,433,988

[45] Feb. 28, 1984

[54] HELMET ADAPTED FOR USE BY HAY FEVER SUFFERERS

[76] Inventor: Richard H. Hinchliffe, 55 Bridge St., Pershore, Worcestershire, England

[21] Appl. No.: 403,320

[22] Filed: Jul. 30, 1982

[30] Foreign Application Priority Data

Aug. 7, 1981 [GB] United Kingdom ................. 8124182

[51] Int. Cl.[3] ............................................. B01D 50/00

[52] U.S. Cl. .......................................... 55/357; 2/425; 55/385 R; 55/467; 55/DIG. 29

[58] Field of Search ..................... 55/467, 473, 385 R, 55/356, 357, 385 A, DIG. 29, DIG. 35; 128/201.25, 201.23, 201.29; 2/424, 425, 10, 205

[56] References Cited

U.S. PATENT DOCUMENTS

| | | | |
|---|---|---|---|
| 3,736,927 | 6/1973 | Misaqui | 128/201.25 |
| 3,963,021 | 6/1976 | Bancroft | 128/201.25 |
| 4,136,688 | 1/1979 | Gorman | 2/10 |
| 4,215,437 | 8/1980 | Kao | 2/10 |

FOREIGN PATENT DOCUMENTS

| | | | |
|---|---|---|---|
| 2825145 | 12/1979 | Fed. Rep. of Germany | 2/202 |
| 732248 | 6/1955 | United Kingdom | 2/10 |
| 1574311 | 9/1980 | United Kingdom | 128/201.25 |
| 698626 | 11/1979 | U.S.S.R. | 128/201.23 |

*Primary Examiner*—Bernard Nozick
*Attorney, Agent, or Firm*—Scrivener, Clarke, Scrivener and Johnson

[57] ABSTRACT

A helmet 1 adapted for use by hay fever sufferers is shaped to fit over the head and face of the wearer and has filtered air supplied to its interior by way of an air supply duct 5 from portable filter means remote from the helmet and adapted to be carried by the wearer. The filter means removes pollen, dust and such airborne matter from the air supplied to the helmet. The filter means comprises disposable filters 9, a battery operated electric motor 8 and a fan 7 driven by the motor which draws air from the atmosphere through the filters and supplies it to the air supply duct 5. The battery 13 energizing the motor is in a separate box 14 from a box 6 containing the filters, motor and fan. Both boxes are adapted to be attached to a belt to be worn by the helmet wearer. There may alternatively be just one pack. The helmet has supports 4 which seat on the wearer's shoulders.

6 Claims, 1 Drawing Figure

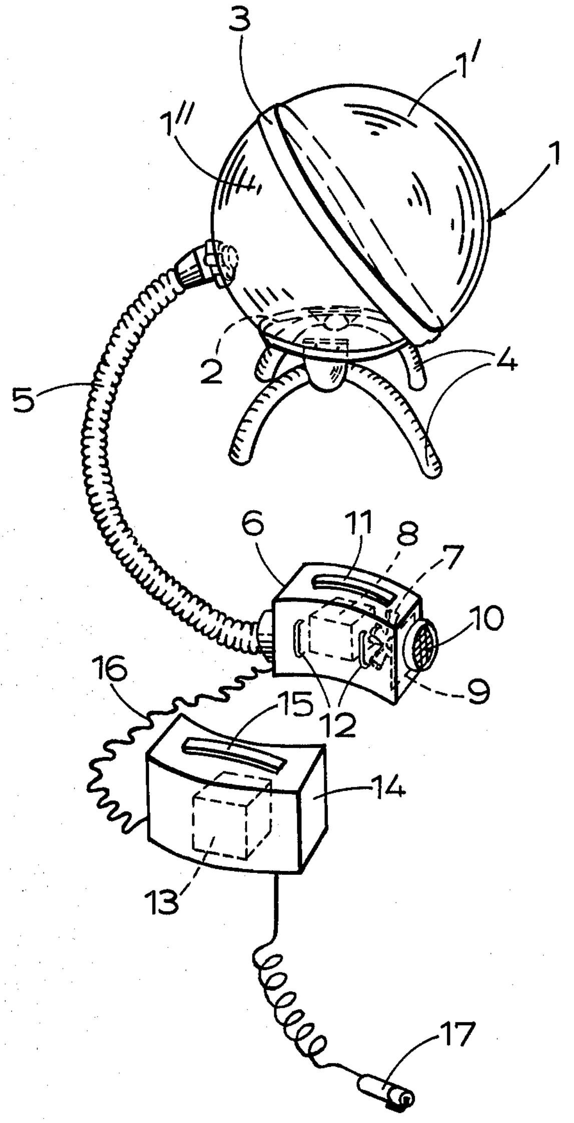
3
1'
1''
1
2
4
5
6
11
8
7
10
16
15
12
9
14
13
17

HELMET ADAPTED FOR USE BY HAY FEVER SUFFERERS

This invention relates to a helmet which is adapted for use by hay fever sufferers.

Drugs prescribed for hay fever sufferers to give relief normally take a while after they have been administered before they take effect to give relief. Sometimes they can give rise to undesirable side effects. The activities of a person who has taken such drugs can be restricted for a while after the drugs have been administered, for example he should not drive a vehicle. Whilst it is realised that drugs are desirable and indeed essential in many cases to provide long lasting relief, there are cases where alternative and more quickly effective remedies are desirable.

An object of the present invention is to provide a means by which hay fever sufferers may obtain some relief.

A further object of the present invention is to provide, in combination, a helmet adapted for use by a hay fever sufferer and portable filter means remote from said helmet constructed and arranged to be carried by the helmet wearer and to supply filtered air to the interior of the helmet for the wearer to breath.

Yet a futher object of the invention is to provide a helmet as aforesaid which comprises support means and a hollow globe mounted on the support means formed by two substantially transparent hemispherical sections joined together equatorially of the globe and having an opening at the bottom for entry of the wearer's head into the globe, the globe being adapted substantially to enclose the head and face of the wearer and the support means being adapted to seat on the wearer's shoulders thereby to support the globe from the wearer's shoulders and leaving the wearer free to move his head inside the globe.

Additionally it is an object of the invention to provide filter means as aforesaid comprising a housing having an air entry, means on the housing whereby the housing can be carried by the helmet wearer, an air supply duct extending from the housing to the globe and accommodated in the housing at least one filter, an electrically powered motor and a fan driven by the motor which operates to draw air from the atmosphere into the housing through the air entry and cause the air to pass by way of the air supply duct to the globe, the filter being positioned for the air to pass through it before passing into the air supply duct and being adapted to remove pollen, dust and the like airbourne matter from the air.

Thus the globe wearer breathes purified air inside the helmet and in so doing it has been my experience that the wearer is able to get relief from nasal and occular congestion. I have found that the wearer may begin to get relief soon after starting to breath the filtered air and that the relief can continue for some time after removal of the helmet.

As the filter means is portable the wearer may walk about and carry on other activities while he is wearing the helmet. The housing of the filter means may be adapted to be attached to a belt, or to a strap or other suitable support which enables the housing to be slung from the wearer's shoulder, or shoulders. Conveniently the housing is readily detachable from the belt, strap or other support so that, if desired, the wearer, whilst still continuing to wear the helmet, may rest the housing on the floor or other surface rather than support it himself when he is not moving about, as when he is sitting or lying down.

Having the filter means remote from the helmet enables the helmet to be kept light in weight so that it is not an undue burden for the wearer to carry. Furthermore the wearer is not subjected to, or is not so conscious of, such noise as the motor and fan may make when in operation.

The motor is preferably battery operated. To enable the wearer of the helmet to have the most freedom of movement it is desirable for the battery or batteries to be readily portable. The battery or batteries may be incorporated in the housing with the motor fan, and the or each filter, or in a separate housing also adapted to be attached to a belt, strap or other suitable support, suitable electrical connections being provided between the battery and the motor. Alternatively, or in addition, the motor may be adapted to be energised from a mains electricity supply, or other electricity supply, as for example that of a motor vehicle, although, of course, the helmet wearer would be more restricted in his movements when the motor is energised in this manner.

Where the filter means is battery operated the battery or batteries is or are preferably of the rechargable type. Recharging means may be provided in conjunction with the battery or batteries to enable the battery or batteries to be readily re-charged from a mains electricity supply, or from another suitable supply such as a vehicle electrical supply.

Conveniently each filter is of the disposable pad or block type which can be replaced by a fresh one when necessary.

An access panel may be provided at the front of the globe by way of which access may be gained to the wearer's face without removing the helmet.

It is desirable for the air supply duct to be flexible. It may, for example, be made of flexible corrugated hose or plastics or rubber tubing.

An embodiment of the invention will now be described by way of example with reference to the accompanying simplified perspective drawing.

In this embodiment a helmet 1 is provided comprising a globe of clear, rigid plastics having an opening 2 at the bottom to enable it to be fitted over the head of a wearer. The globe is constructed from front and rear hemispherical sections 1' and 1" joined together by an oblique equatorial band 3. The front section 1' is a complete hemisphere whereas the rear section 1" contains the opening 2. The globe affords good all round unrestricted vision to the wearer. At opposite sides of the opening 2 the rear section 1" of the helmet has supports 4 of inverted U-shape secured to it which are arranged to sit on the wearer's shoulders so that the helmet is supported from the wearer's shoulders leaving the wearer free to move his head inside the globe.

A flexible corrugated hose 5 opening to the interior of the helmet at the lower part of the back of the rear section 1" of the helmet, extends to a plastics box 6 in which a fan 7 driven by an electric motor 8 is housed and disposable filters 9. The fan 7 draws air into the box 6 through a grille or other suitable perforate inlet 10 of the box to pass through the filters 9. The filters remove dust, pollen and like matter from the air before it passes into the hose 5 to be supplied to the helmet. A carrying handle 11 is provided on the box 6 and also loops 12 by which it may be attached to a belt to be worn by the wearer of the helmet.

The electric motor 8 is energised by a small, relatively light weight battery 13 which is housed in a second plastics box 14 also provided with a carrying handle 15 and loops, not shown, for attaching the box to a belt. This second box 14 is similar to the box 6 housing the motor, fan and filters. A flexible insulated cable 16, which may be coiled, extends between the two boxes 6 and 14 and contains the leads which electrically connect the battery to the motor 8.

A connector 17 is attached to the battery box 14 whereby the battery can be connected to a mains electricity supply, or to a vehicle electrical supply, for the battery to be re-charged. Alternatively the connector 17 may be adapted for connection to a mains supply or vehicle battery for the motor to be energised by that energy source.

Exhaled breath from the wearer of the helmet passes out of the helmet through the opening 2.

The supports 4 may be attached to a harness adapted to be strapped to the wearer's body. This may be desirable at least for some activities of the wearer to help in holding the helmet more stably in position.

It will be appreciated that the helmet can readily be fitted for use, and that it allows the wearer substantial freedom of movement. The helmet is of a size which enables it to be stored away without occupying too much space when not in use, possibly with the two boxes, cable 16, connector 17 and hose 5 packed inside the globe, and which makes it easily transportable in a vehicle to be available for use should an occupant of the vehicle feel the need for it.

A helmet, and its associated equipment, in accordance with the invention may be made light enough for it to be worn by children. Different sizes may of course be made for different ages, or age groups, through to adults.

Whilst the helmet is particularly intended for use by hay fever sufferers it may be that sufferers from asthma and some other respiratory conditions, and from eczema and other such skin complaints, may also obtain some relief by wearing the helmet.

I claim:

1. In combination a helmet adapted for use by a hay fever sufferer and portable filter means remote from said helmet constructed and arranged to be carried by the helmet wearer and to supply filtered air to the interior of said helmet for the wearer to breath, said helmet comprising support means and a hollow globe mounted on said support means formed by two substantially transparent hemispherical sections joined together equatorially of said globe and having an opening at the bottom for entry of the wearer's head into said globe, said globe being adapted substantially to enclose the head and face of the wearer and said support means being adapted to seat on the wearer's shoulders thereby to support said globe from the wearer's shoulders and leaving the wearer free to move his head inside said globe, and said portable filter means comprising a housing, having an air entry, means on said housing whereby said housing can be carried by the helmet wearer, an air supply duct extending from said housing to said globe, and accommodated in said housing at least one filter, an electrically powered motor and a fan driven by said motor which operates to draw air from the atmosphere into said housing through said air entry and cause the air to pass by way of said air supply duct to said globe, said filter being positioned for the air to pass through it before passing into said air supply duct and being adapted to remove pollen, dust and like airbourne matter from the air.

2. The combination according to claim 1 wherein said support means comprises a pair of supports of inverted U-shape secured to said globe at opposite sides of said opening.

3. The combination according to claim 1 wherein a harness is attached to said support means adapted to be strapped to the wearer's body to secure said helmet on the wearer.

4. The combination according to claim 1 wherein said globe and said portable filter means are constructed and arranged such that said portable filter means can be packed away inside said globe when said helmet is not in use.

5. The combination according to claim 1 wherein said hemispherical sections are joined together by an oblique equatorial band and are arranged such that they respectively form front and rear portions of said helmet.

6. The combination according to claim 5 wherein said hemispherical section forming said front portion of said globe is a complete hemisphere and said other hemispherical section is formed with said opening.

* * * * *